(12) United States Patent
Zaaijer et al.

(10) Patent No.: US 8,887,581 B2
(45) Date of Patent: Nov. 18, 2014

(54) LOAD-MEASURING BEARING UNIT

(75) Inventors: Erik Zaaijer, Nieuwegein (NL); Cornelius Petrus Antonius Vissers, Den Dungen (NL)

(73) Assignee: Aktiebolaget SKF, Gothenburg (SE)

( * ) Notice: Subject to any disclaimer, the term of this patent is extended or adjusted under 35 U.S.C. 154(b) by 213 days.

(21) Appl. No.: 13/375,277

(22) PCT Filed: Jun. 2, 2010

(86) PCT No.: PCT/EP2010/003333
§ 371 (c)(1),
(2), (4) Date: Feb. 6, 2012

(87) PCT Pub. No.: WO2010/139457
PCT Pub. Date: Dec. 9, 2010

(65) Prior Publication Data
US 2012/0128287 A1 May 24, 2012

(30) Foreign Application Priority Data
Jun. 5, 2009 (WO) ................ PCT/EP2009/004057

(51) Int. Cl.
*G01L 5/12* (2006.01)
*G01D 7/00* (2006.01)
*G01L 1/22* (2006.01)
*G01L 5/00* (2006.01)
*F16C 19/52* (2006.01)

(52) U.S. Cl.
CPC ............. *G01L 5/0019* (2013.01); *G01L 1/2231* (2013.01); *F16C 19/522* (2013.01)
USPC ............... 73/862.49; 73/862.041; 73/862.043

(58) Field of Classification Search
USPC ......................... 73/862.49, 862.041–862.046
See application file for complete search history.

(56) References Cited

U.S. PATENT DOCUMENTS 4,168,160 A 9/1979 Stoferle et al.
4,821,582 A 4/1989 Meyer et al.
(Continued)

FOREIGN PATENT DOCUMENTS

EP 0355656 A2 2/1990
EP 0397921 A1 11/1990
(Continued)

*Primary Examiner* — Lisa Caputo
*Assistant Examiner* — Jonathan Dunlap
(74) *Attorney, Agent, or Firm* — Bryan Peckjian; SKF USA Inc. Patent Department (57) ABSTRACT

A bearing unit (20) for measuring forces exerted on the bearing unit, comprising an inner member (3) concentrically arranged around an outer member (2), at least one rolling element bearing (4, 5) and at least one load measuring device (8, 9) with a cylindrical bore. The load measuring device (8, 9) is mounted to one of the members (3) and supports the rolling element bearing (4, 5) relatively to this member (3). The rolling element bearing (4, 5) is mounted to the other of the members (2) and supports this member (2) relatively to the load measuring device (8, 9). Thus, a force acting on the bearing unit is transferred from one of the inner and outer members (2, 3) to the other of the inner and outer members (2, 3) via the at least one load measuring device (8, 9). According to the invention, the at least one load measuring device (8, 9) and the at least one rolling element bearing (4, 5) are arranged laterally to each other in a radial gap between the inner and outer members (2, 3).

18 Claims, 3 Drawing Sheets

(56) References Cited

U.S. PATENT DOCUMENTS

| | | | |
|---|---|---|---|
| 6,308,583 B1 * | 10/2001 | Gunness et al. | 73/862.631 |
| 6,490,935 B1 | 12/2002 | Joki et al. | |
| 7,240,570 B2 | 7/2007 | McDearmon | |
| 7,685,890 B2 * | 3/2010 | Mol et al. | 73/862.322 |
| 7,971,495 B2 * | 7/2011 | Loenner et al. | 73/862.474 |
| 8,117,923 B2 * | 2/2012 | Sasaki | 73/862.49 |
| 8,453,521 B2 * | 6/2013 | Sasaki | 73/862.49 |
| 2002/0178841 A1 | 12/2002 | Kobayashi et al. | |
| 2010/0005907 A1 * | 1/2010 | Kato et al. | 73/862.044 |

FOREIGN PATENT DOCUMENTS

| | | |
|---|---|---|
| FR | 2708044 A1 | 1/1995 |
| JP | 2007171102 A | 7/2007 |
| WO | WO2006122269 A1 | 11/2006 |
| WO | WO2007043885 A1 | 4/2007 |

* cited by examiner

LOAD-MEASURING BEARING UNIT

CROSS-REFERENCE

This application is the US national state of International Application No. PCT/EP2010/003333 filed on Jun. 2, 2010, which claims priority to International Application No. PCT/EP2009/004057 filed Jun. 5, 2009.

FIELD OF THE INVENTION

The present invention relates to a bearing unit capable of measuring the loads acting thereon, which in one embodiment is a hub bearing unit that is suitable for measuring vehicle wheel forces transferred to a suspension component of e.g. a motorcycle. The invention further relates to a device for measuring loads, which device may be integrated in the bearing unit.

BACKGROUND OF THE INVENTION

A hub is part of the mechanical interface between a wheel and the chassis of a vehicle. The hub may be mounted to the rim of a wheel, either directly in the rim or connected to the rim by spokes or the like. In some examples, the hub is further provided with one or more bearings that are mounted in the hub such that the bearing outer ring is fixed to the hub. The inner ring of the bearing is mounted to an axle of some kind. The axle is used to mount the wheel to a vehicle. In this way, the wheel will be able to rotate in relation to the vehicle.

A hub may comprise a bearing unit, where the bearing unit comprises rolling element bearings and an outer and inner sleeve of some kind. A hub unit may comprise a bearing unit and a shaft. Such a bearing unit or a hub unit is easier to mount in machinery or on a vehicle and is also more cost-effective to use, since it comes pre-assembled and pre-greased. It will also save maintenance cost by allowing the complete bearing unit or hub unit to be replaced as one part in case of failure.

When a bearing unit is used on a vehicle, the bearing unit is exposed to different loads. It is of advantage to be able to measure the loads imposed on a bearing unit, since these loads will be measured on the unsprung mass of the vehicle. The knowledge of the forces imposed on the hub can be used for several different vehicle functions, both to improve the comfort and safety for the user. Load monitoring is also useful for the prediction of maintenance intervals.

It is possible to measure the loads imposed on a hub in different ways. One way is to use accelerometers measuring in one or more directions. Another way is to use strain sensors positioned in the hub, either on the inner or outer races of the bearings or on a non-rotating part of the hub assembly. U.S. Pat. No. 4,168,160, JP2007171102, WO 06122269 and U.S. Pat. No. 6,490,935 describe different bearing assemblies with integrated force measuring capabilities.

WO 07043885 describes a bearing and shaft assembly, in which strain sensors are provided on an inner tubular element, which is mounted between the shaft and the bearings. This bearing and shaft assembly is especially adapted for the use on a motorcycle.

Furthermore, in U.S. Pat. No. 7,240,570, a load sensing bearing is suggested in which the bearing outer ring is supported within a flange assembly, whereby the flange assembly is used to mount the bearing to an application structure. The flange assembly comprises anisotropic spring regions and is instrumented with load cells for measuring forces and moments acting on the bearing.

There is still room for improvement, however, in terms of realizing a compact and lightweight bearing unit that is capable of accurately measuring axial forces, radial forces and moments acting on the bearing. There is also a need for an improved load measuring device that enables the realization of such a bearing unit.

SUMMARY OF THE INVENTION

In a first aspect, the present invention resides in a bearing unit comprising an inner member, an outer member and at least one rolling element bearing, which are arranged such that an inner and an outer ring of the bearing lie between the inner and the outer member and such that the inner member and the outer member are relatively rotatable about an axis of rotation. The unit further comprises a load measuring device having a cylindrical bore, which device is also arranged between the inner member and the outer member of the bearing unit and has an axial centreline that coincides with the axis of rotation. The load measuring device supports the rolling element bearing, whereby a first section of the device is coupled to one of the inner and outer members and a second section of the device is coupled to one of the bearing rings; the other of the bearing rings is coupled to the other of the inner and outer members. Thus, a force acting on the bearing unit is transferred from one of the inner and outer members to the other of the inner and outer members via the load measuring device, which is suitably provided with one or more strain sensors to measure the force. According to the invention, the rolling element bearing and the load measuring device are arranged laterally to each other such that a radial centreline of the bearing is axially offset from a radial centreline of the load measuring device.

In other words, the rolling element bearing is mounted at a side of the load measuring device. This enables a more compact bearing unit in relation to previously known load measuring bearing units whereby, for example, the bearing outer ring is supported or integrated within an instrumented flange assembly (load measuring device). In a bearing unit according to the invention, only a relatively small gap is required between an outside diameter of the inner member and the inside diameter of the outer member. A further advantage of an axial offset between the rolling element bearing and the load measuring device is that the measurements are not influenced by the cyclical disturbances associated with the passage of rolling elements.

In some embodiments of the invention, the rolling element bearing is a flanged bearing, where one of the inner or outer bearing rings comprises a radially extending flange. This flange is then fixedly attached at one side face of the load measuring device by means of e.g. bolts or a suitable heat joining process. In other embodiments, the bearing unit comprises a separate support for the rolling element bearing. The bearing support then comprises a radially extending flange that is fixedly attached to the load measuring device. The rolling element bearing can be a single-row bearing, or can comprise more than one row of rolling elements depending on the application loads. Similarly, when a flanged bearing is used, the bearing may comprise one or more rows of rolling elements.

The bearing unit can be adapted for rotation of the inner member or of the outer member. Thus, in some embodiments, the inner member is a fixed shaft and the outer member is a hub of a rotatable component such as a vehicle wheel or a wind turbine blade. In other embodiments, the inner member is a rotatable shaft and the outer member is a fixed mounting structure of a machine or of a vehicle suspension system.

In an advantageous further development of the invention, the inner and the outer members are formed by tubular elements which are mountable to the components as described above. The advantage of this development is that the bearing unit becomes a self-contained unit that can easily be dismounted and replaced, and can be retrofitted to existing machines or vehicles.

Preferably, the load measuring device in a bearing unit according to the invention is connected to whichever of the inner or outer member is non-rotational in use. The load measuring device comprises one or more sensors, and having the sensors mounted on a non-rotating part of the bearing unit simplifies the cabling to the sensors. In the example where the inner member is non-rotational in use, the load measuring device has a rigid inner section comprising a bore having essentially the same diameter as the outside diameter of the inner member. In a mounted condition, the inner section of the load measuring device is thus in contact with the inner member. The load measuring device further comprises a rigid outer section, to which the radially extending flange of the bearing support or of the flanged bearing ring is connected. In the given example, the radially extending flange is either part of a bearing inner ring or supports a bearing inner ring. The bearing outer ring is mounted in the outer member by means of e.g. a press fit.

Thus as the outer member rotates, forces acting thereon are transferred to the inner member, first via the bearing and then via the load measuring device. To enable these forces to be measured, the rigid outer section and the rigid inner section of the load measuring device are joined by at least one deformable portion that is provided with one or more strain sensors. The deformable portion is relatively thin (measured in axial direction) compared with the inner and outer sections of the load measuring device, and the one or more strain sensors are provided on at least one surface of the deformable portion, which surface lies in a plane perpendicular to the axis of rotation of the bearing unit. In one embodiment, the one or more strain sensors are resistive strain gauges. In other embodiments, the strain sensors can employ magneto-elastic, magnetostrictive or optical measurement techniques, or any other suitable strain-measuring technique known in the art.

In one embodiment, the deformable portion of the load measuring device is a membrane that is provided with at least three strain sensors, spaced at even angular intervals on one radial side face. Preferably, both sides of the membrane are provided with at least three strain sensors, as this enables an accurate determination of both radial and axial force.

In an inventive further development, the load-measuring device comprises three deformable portions executed as relatively thin spokes that connect the rigid inner and outer sections of the device. The advantage of a load measuring device with three deformable portions is that the device is statically determinate and thus responds in a predictable manner when forces act thereon. When a radial force acts on the bearing unit, tensile stresses are induced in the spokes; an axial force induces bending stresses. To measure these stresses, at least one of the spokes is provided with a strain sensor on a surface lying in a plane perpendicular to the axis of rotation. The strain sensor can be a resistive strain gauge or any other suitable type of strain sensor known in the art. Advantageously, each strain sensor is mounted with an offset relative to a lateral centreline of the spoke. As a result, the strain sensor is able to measure tensile stress as well as bending stress. Furthermore, each of the spokes may be thus provided with a strain sensor on one or both sides of the spoke, to enhance the accuracy of determining the axial and radial forces. The load measuring device may also comprise a temperature sensor. In some embodiments, a temperature sensor is provided on one or more of the spokes. The provision of one or more temperature sensors is advantageous when the measurements of the one or more strain sensors need to be temperature compensated.

In a second aspect, the present invention also defines a load measuring device comprising three spokes, as described above.

In one advantageous application of a bearing unit according to the invention, the bearing unit is a hub bearing unit for a motorcycle and comprises a first and a second rolling element bearing which are axially spaced apart in relation to each other. At least the first rolling element bearing is supported between the inner and the outer member by a first load measuring device. Preferably, the second rolling element bearing is supported between the inner and outer member by a second load measuring device. The advantage of a second load measuring device is that the moments acting on the bearing unit can be measured. In addition, the measurements of the second load measuring device can be used to obtain a more accurate determination of the axial and radial forces acting on the bearing unit. In one example of this embodiment, the first and second load measuring devices are arranged laterally between the first and second rolling element bearings. In another example, the first load measuring device is arranged at an axially outer side of the first bearing and the second load measuring device is arranged at an axially outer side of the second bearing.

Thus, the load acting on a bearing unit can be measured directly and in real time. One advantage of measuring in this way, when the bearing unit is mounted on a vehicle, is that the bearing unit is part of the unsprung mass of the vehicle. By measuring directly on the bearing unit, the actual load acting on the bearing unit can be measured. When measuring the load on the chassis of the vehicle, i.e. on the sprung mass, the interference of shock absorbers, suspensions etc. will influence the measurements. This will give a less reliable result and such a measuring system will have a slower response time.

Although suited to vehicular wheel applications, the present invention may be applied in many other fields of industry where there is a need to determine the loads acting on a rotationally supported component. For example, in machines for producing fabrics, paper and foils where a load-sensing bearing unit can be used for controlling the tension of bands or tapes and for measuring the loading of e.g. a conveyor.

A bearing unit according to the invention is robust, compact, enables a highly accurate determination of load and can be used in a wide variety of applications. The same applies to a load measuring device according to the invention. Other advantages will become apparent from the following description and accompanying drawings.

BRIEF DESCRIPTION OF DRAWINGS

The invention will be described in greater detail in the following, with reference to the embodiments that are shown in the attached drawings, in which.

MODES FOR CARRYING OUT THE INVENTION

The embodiments of the invention with further developments described in the following are to be regarded only as examples and are in no way to limit the scope of the protection provided by the patent claims.

Figure 1:
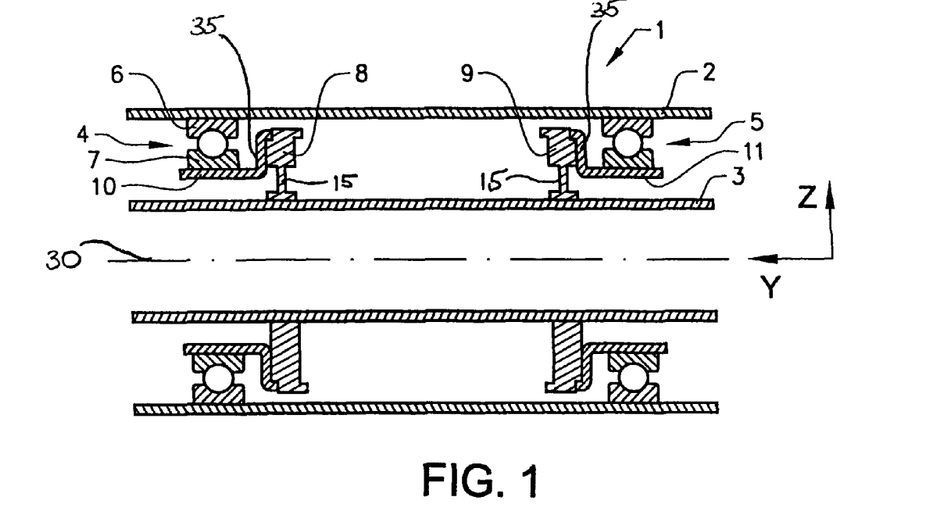
FIG. 1 shows a cross-sectional view of an example of a first embodiment of a bearing unit according to the invention.

FIG. 1 shows an example of a first embodiment of a bearing unit according to the invention. The bearing unit 1 comprises an outer member 2 concentrically arranged around an inner member 3, such that there is a radial gap between an inside diameter of the outer member 2 and an outside diameter of the inner member 3. Mounted within this radial gap, the unit 1 further comprises a first rolling element bearing 4 and a second rolling element bearing 5 which are spaced apart in an axial direction Y. The bearings 4, 5 each comprise an outer ring 6 and an inner ring 7, with a plurality of rolling elements arranged there between. In the example of FIG. 1, the rolling elements are balls, but other types of rolling element such as cylindrical rollers, needle rollers, tapered rollers or spherical rollers can also be used. The bearing rings 6, 7 of the first and second bearings 4, 5 are relatively rotatable about an axis of rotation 30.

To measure forces and moments acting on the bearing unit, the unit 1 is further provided with a first load cell 8 and a second load cell 9, each of which has a central opening or bore with an axial centreline that coincides with the bearing axis of rotation 30. The first and second load cells 8, 9 are also mounted in the radial gap between the inner and outer members 8, 9 and are arranged laterally to the first and second bearings. In this example, the bearing unit is adapted for outer ring rotation and the outer ring 6 of the first and second bearings 4, 5 is securely mounted within the outer member 2 by means of e.g. an interference fit. The outer member 2 can be a tubular element, as shown, whereby the tubular element is mountable within a vehicle wheel hub or some other rotational machine component. Alternatively, the outer member can be formed by the vehicle wheel hub or by the rotational machine component. The inner ring 7 of the first and second bearings 4, 5 is coupled to a radial side face of the first and second load cells 8, 9 respectively. An inner section of each load cell is coupled to the inner member 3; i.e. the bore of each load cell 8, 9 is mounted over the inner member 3, so as to be in connection with the inner member. Thus, the first load cell 8 supports the first bearing 4 and the second load cell 9 supports the second bearing 5 relatively to the inner member 3, while the first and seconds bearings 4, 5 support the outer member 2 relatively to the first and second load cells 8, 9, meaning that forces exerted on the outer member 2 are transmitted to the inner member 3 via the first and second bearings 4, 5 and then via the first and second load cells 8, 9.

The inner member in this example is non-rotational in use and it is advantageous to mount the load cells to this member 3, as this simplifies the electrical wiring to the load cells. However, with the aid of slip rings, for example, it would be possible to mount the load cells to a rotating part of the bearing unit. The inner member can be a shaft or an axle, or the inner member can also be a tubular element that is mountable over the shaft or axle. In an advantageous embodiment of the invention, both the inner and the outer members are formed by tubular elements. The bearing unit then becomes a self-contained unit that can be retrofitted to existing machinery. Furthermore, such a self-contained unit can be readily dismounted for servicing and maintenance and is easy to refit or replace.

According to the invention, the first and second load cells are arranged laterally to the first and second bearings. In the example shown in FIG. 1, this is achieved in that the bearing unit 1 further comprises a first bearing support 10 on which the inner ring of the first bearing 4 is mounted, and comprises a second bearing support 11 on which the inner ring of the second bearing 5 is mounted. The first and second bearing supports 10, 11 each comprise a radially extending flange 35. The radially extending flange 35 of the first and second bearing supports 10, 11 is fixedly attached to the radial side face of the first and second load cells 8, 9 respectively. In an alternative example, the bearings comprise a flanged inner ring, and the flange part of a bearing ring is attached to the radial side face of a load cell. Mechanical fixation means such as bolts may be used to attach the flange part of a bearing ring or of a bearing support to a load cell. Other joining techniques such as energy welding or adhesive bonding are also possible.

The bearing unit depicted in FIG. 1 comprises two single-row bearings. In further embodiments the bearing unit comprises two double-row rolling element bearings. In still further embodiments, the bearing unit comprises only a first single-row or double-row rolling element bearing that is arranged laterally to and supported by a first load cell. In other words, the number and type of rolling element bearings used may be selected according to the application requirements that the bearing unit must meet.

In one embodiment of a bearing unit comprising first and second axially spaced-apart bearings, the first and second load cells are arranged at an axially inner side of the first and second bearings respectively; i.e. between the first and second bearings, as shown in FIG. 1. The first and second load cells 8, 9 are suitably arranged with as large an axial spacing between them as possible, as this enhances the stiffness of the bearing unit. In an alternative embodiment, the first load cell is arranged at an axially inner side of the first bearing and the second load cell is arranged at an axially outer side of the second bearing. In a further alternative embodiment, the first and second load cells are arranged at an axially outer side of the first and second bearings respectively. This enables a larger axial spacing between the first and second load cells, which is advantageous in applications where a particularly high degree of rotational stiffness is required.

The lateral arrangement of the first load cell 8 relative to the first bearing 4 and the second load cell 9 relative to the second bearing 5, when present, enables a compact bearing unit, since a radial gap between the inner and outer members 2, 3 need only be slightly larger than whichever of the bearing and the load cell has a larger radial thickness. In conventional load-measuring bearings units that comprise a load cell, the bearing is generally mounted within the bore of the load cell, meaning that the radial gap must be sufficiently large to accommodate the combined radial thickness of the load cell and the bearing, i.e. the radial gap must span from the inside diameter of the bearing to the outside diameter of the load cell. A conventional bearing unit of this kind can be made more compact by reducing the radial thickness of the load cell and/or of the bearing, but this will compromise the load-carrying capacity of the unit.

By contrast, in a bearing unit according to the invention, the radial dimensions of the one or more bearings and of the one or more load cells may be selected to give the necessary robustness to the unit as a whole, without having to compromise on compactness. It is particularly important that the radial dimensions of the one or more load cells enable a sufficient load-carrying capacity, since the bearings, the outer member 2 and the weight of any component carried by the outer member are supported by the load cells.

A further advantage of the lateral arrangement of the load cells relative to the bearings is that the measurements of the load cells are not affected by the cyclical passage of rolling elements. This cyclical passage is known as the ball pass signal, and in many applications is an unwanted signal artefact that is filtered out. Thus, the signal processing in a bearing unit according to the invention is simplified.

To measure the forces acting on the bearing unit, each load cell 8, 9 is provided with one or more strain sensors which are arranged to measure radial and/or axial forces. The combined measurements of the first and second load cells enable the moments to be determined. As mentioned, the load cell needs to be robust, and therefore comprises a rigid inner section and a rigid outer section which are joined by at least one deformable portion 15 that is relatively thinner than the inner and outer sections. The rigid inner and outer sections provide each load cell with the necessary strength, while the at least one deformable portion 15 deforms as a result of a force acting on the bearing unit, allowing this force to be measured. The one or more strain sensors are therefore provided on the deformable portion and are preferably provided on a surface of the deformable portion that lies in a plane perpendicular to the axis of rotation 30.

With reference to FIG. 1, the radially extending flange 35 of the first bearing support 10 is connected to the rigid outer section of the first load cell 8. Thus, when a radial force is exerted on the outer member 2, this force is transmitted from the bearing outer ring 6 to the bearing inner ring 7 via the rolling elements, and is then transmitted from the inner ring 7 to the first load cell 8 via the first bearing support 10. The radial force is transmitted to the second load cell 9 via the second bearing 5 and the second bearing support 11 in a similar manner. A radial force puts the load cells under tension. The resulting tensile stresses are measurable on the deformable portion 15. When the bearing unit is subject to an axial force that causes a relative displacement between the inner ring 7 and the outer ring 6 of the first and second bearings 4, 5, a similar relative displacement is experienced by the rigid inner and outer sections of the first and second load cells respectively. The relative displacement causes the deformable portion 15 to bend, meaning that the bending stresses measured are proportional to the axial forces on the bearing unit.

Figure 3:
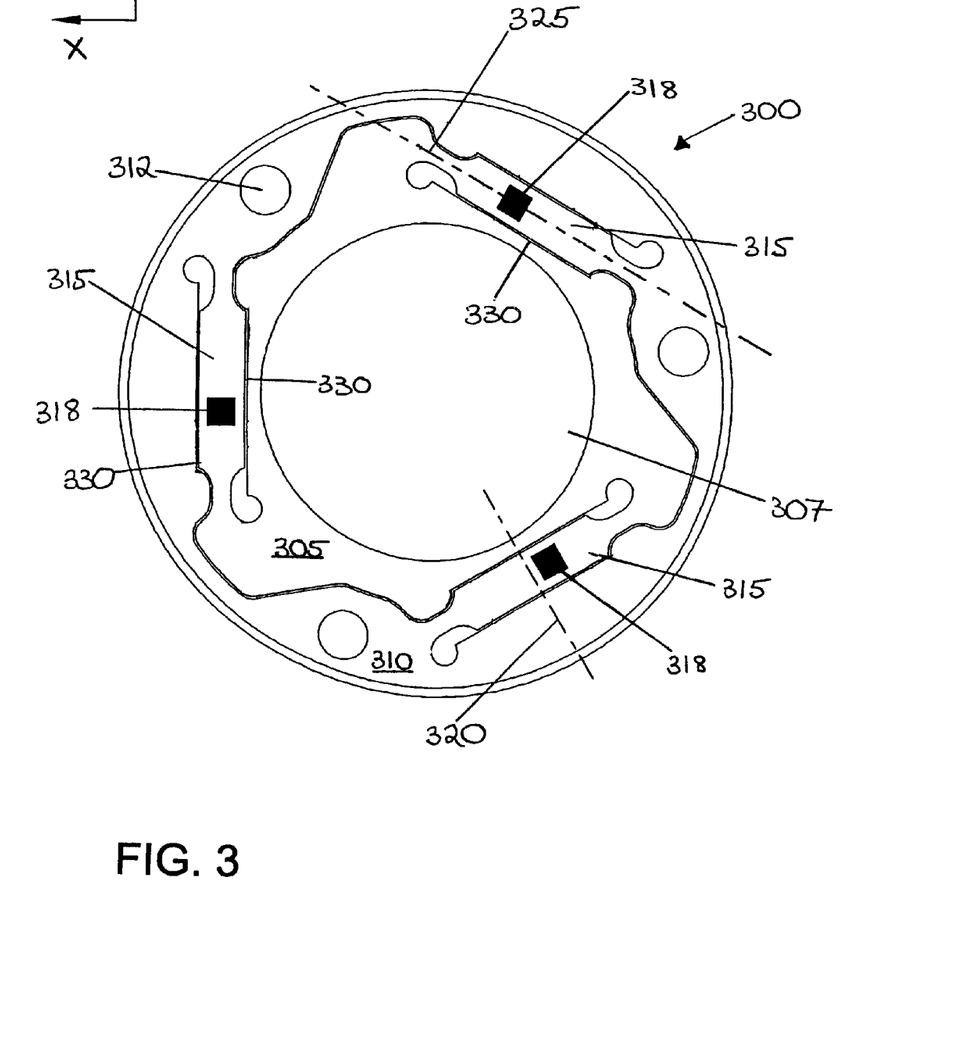
FIG. 3 shows an axial view of a load measuring device according to the invention.

The at least one deformable portion of each load cell can be a membrane. In an inventive embodiment, representing a second aspect of the present invention, the rigid sections of a load cell are connected by three spokes. An example of such a load cell according to the second aspect of the invention is illustrated in FIG. 3, which shows an axial view of the load cell.

The load cell 300 comprises a rigid first section 305 (inner section) having a through-opening (bore) 307, enabling the load cell to be mounted on a cylindrical component such as a shaft. In use, an axial centreline of the load cell will coincide with an axis of rotation of a bearing supported by the load cell. The load cell 300 further comprises a rigid second section 310 (outer section), which predominantly lies radially outward of the rigid first section 305. The second section 310 may comprise a plurality of mounting holes 312, to enable a component such as flanged bearing or bearing support to be mounted to the load cell. The first and second sections of the load cell are joined by three spokes 315 which have a thickness, measured in axial direction, that is less than a corresponding thickness of the first section 305 and of the second section 310. Further, each spoke 315 has a length that is greater than its width, where the length and width are measured in a plane perpendicular to the axial centreline, and each spoke has a longitudinal centreline 325 (in the direction of its length) and a lateral centreline 320 (in the direction of its width).

A load cell according to the invention has three spokes (deformable portions), suitably arranged between the first and second section 305, 510 at regular angular intervals. As a result of this number of spokes 315 and the triangular arrangement, the load cell is statically determinate, and will therefore respond in a predictable manner when forces act thereon.

To measure these forces, a first surface of at least one of the spokes is provided with a strain sensor 318, where the first surface lies in a plane perpendicular to the axial centreline of the load cell 300. Preferably, as shown, each of the spokes is provided with a strain sensor. The strain sensors 318 are provided only on surfaces that are perpendicular to the axial centreline. In conventional load cells, strain sensors are generally also provided on a surface that lies in a plane parallel to the axial centreline, such that the strain sensors measure in an axial direction. The surface must therefore have a certain axial thickness, so that a measurable strain reading is obtainable. A load cell according to the invention is not bound by this requirement and can therefore be executed in a more compact and lightweight design.

When axial forces are of interest, these can be measured with a load cell according to the invention without the need for an axially oriented strain sensor. As described previously, a relative displacement between the first section 305 and the second section 310 of the load cell, due to an axial force, causes the spokes 315 to bend. The induced bending stresses are measurable in that the strain sensor 318 on a particular spoke 315 is arranged with an offset relative to the lateral centreline 320 through the spoke. This is because the bending stress is zero at the lateral centreline 320 of each spoke 315. Further, as previously described, radial forces acting on the load cell induce tensile stresses in the spokes 315. These are also measurable with the strain sensors 318.

In an advantageous further development, the first surface and a second surface of one or more spokes are provided with a strain sensor, where the second surface lies in a plane parallel to the first surface. This enhances the accuracy of the determination of the forces. When measuring radial force, the two sensor signals on opposite surfaces of each spoke are added. When measuring axial force, the sensor signal on the first surface of a spoke is subtracted from the sensor signal on the second surface. Thus, a load cell according to the invention is an axially compact device that can be used to measure radial and axial forces with a high degree of accuracy.

A load cell according to the invention is also radially compact in terms of the radial distance between the inside diameter of the first section 305 and the outside diameter of the second section 310. This achieved in that the three spokes 318 are arranged in a triangular fashion between the first and second sections 305, 310 of the load cell. In other words, the longitudinal centreline 325 of each spoke 315 intersects the longitudinal centreline of the two adjacent spokes. The area enclosed by the intersecting longitudinal centrelines 325 is therefore triangular in shape. In the example shown in FIG. 3, the spokes are arranged with an even spacing, meaning that an essentially equilateral triangle is formed by the intersecting longitudinal centrelines 325. An uneven spacing is also possible.

Due to the triangular arrangement of the spokes 315, the radial distance between the inside diameter of the first section and the outside diameter of the second section can be less than the length of a spoke 315, thereby enabling a radially compact device. A load cell according to the invention is therefore radially and axially compact, and is suitably designed with the necessary load-carrying capacity for a specific application. If the load cell were to experience an excessive peak load, however, this could damage the spokes 315 and the device is therefore advantageously provided with overload protection. This overload protection is executed as three slots 330, which are thin through-cuts having a uniform, predetermined width. Each slot 300 begins at the first section 305 of the load cell, next to where one spoke joins the first section 305, and ends at the second section 310 of the load cell, next to where a following spoke joins the second section 310. Thus, each slot 300 forms a gap between the first section 305 and a radially inner longitudinal edge of one spoke, and forms a gap between the second section 310 and a radially outer longitudinal edge of the following spoke. Furthermore, in a region between two consecutive spokes, each slot forms a gap that separates the first and second sections 305, 310 of the load cell. The width of the slots 330 is selected such that the gap closes when the load cell 300 experiences a predetermined maximum load. The load is then transferred between the first and second sections directly, thereby preventing the spokes from being damaged. In one example, the slots 330 have a width of approximately 0.5 mm.

The load cell as described above is suitable for integration in a bearing unit according to the invention of the type shown in FIG. 1. In other words, the inside diameter of the first section 305 is essentially the same as the outside diameter of the inner member, so that the load cell can be mounted over the inner member in a contacting fashion and support the outer member.

In a second embodiment of a load cell according to the invention, the load cell is adapted to support an inner member. With reference again to FIG. 3, the first section 305 of the load cell 300 then has an inside diameter that is larger than the outside diameter of the inner member, e.g. a shaft. In other words, the shaft can pass through the cylindrical bore 307 of the load cell with a clearance. Furthermore, in the second embodiment, the first section 305 of the load cell may comprise mounting holes 312, to enable a component such as a flanged bearing or a flanged bearing support to be mounted to the first section 305. Correspondingly, the second section 310 of the load cell 300 is adapted for mounting in e.g. a housing, in which case the second section 310 may have outside diameter that is essentially the same as a bore of the housing.

A load cell according to this second embodiment is suitable for integration in a bearing unit according to the invention that is adapted for inner ring rotation or outer ring rotation, but in a preferred embodiment is integrated in a bearing unit adapted for inner ring rotation. As described previously, the cabling to the strain sensors 318 is more straightforward when the load cell is mounted to a non-rotational part of the bearing unit. An example of such a bearing unit, having a rotatable inner member, is shown in cross-section in FIG. 2.

Figure 2:
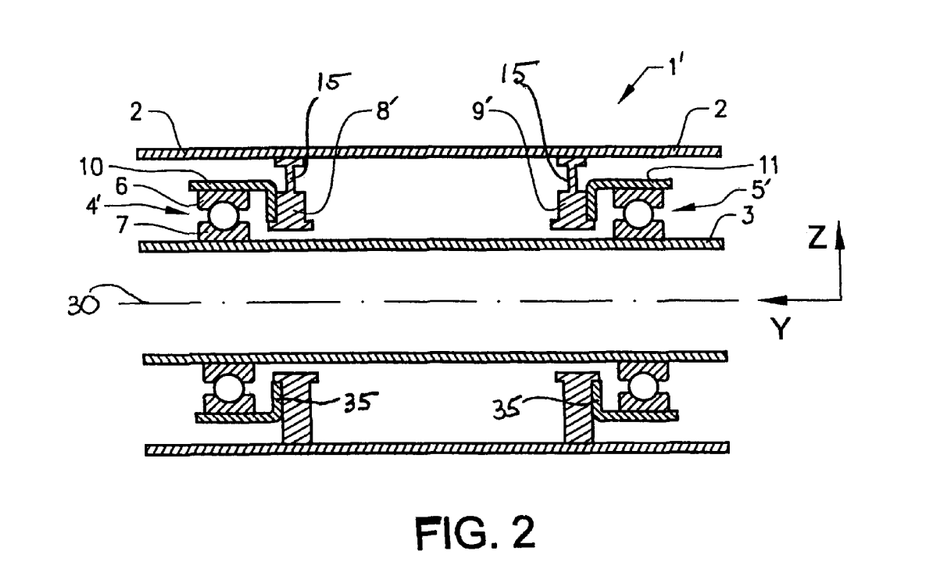
FIG. 2 shows a cross-sectional view of an example of a first embodiment of a bearing unit according to the invention.

Like the embodiment of FIG. 1, the bearing unit 1' in this example comprises an outer member 2 concentrically arranged about an inner member 3, whereby first and second rolling element bearings 4', 5', axially spaced apart in relation to each other, are arranged between the members 2, 3. The unit further comprises first and second load cells 8', 9', mounted to the outer member 2, which respectively support the first and second bearings relative to the outer member 2. Again, the first bearing 4' is mounted on a first bearing support 10 and the second bearing 5' is mounted on a second bearing support 11. In this example, the outer ring 6 of the first and second bearings is mounted to the corresponding bearing support 10, 11 and the inner ring 7 of the first and second bearings is mounted to the inner member. Thus, the inner member 3 is supported relatively to the first and second load cells 8', 9' by the first and second bearings 4', 5' respectively.

In this example, the inner member 3 is a rotational shaft, or a tubular element mountable to a rotational shaft. The outer member 3 is a tubular element that is mountable within a machine housing. The outside diameter of the outer section (second section) of the load cells 8', 9' is mounted to the outer member 2 by means of a fit. The radially extending flange 35 of the first bearing support 10 is mounted to the inner section (first section) of the first load cell 8', at an axially outer side face, and the flange 35 of the second bearing support 11 is correspondingly mounted to the second load cell 9'. Thus, radial and axial forces acting on the inner member 3 are transferred to the outer member 2, via the first and second load cells. As described previously, the inner and outer sections of each load cell are joined by three spokes 15, which spokes are provided on one or both sides with a strain sensor for measuring the radial and axial forces on the bearing unit. When measuring the moments on the bearing unit, the radial forces determined from the first load cell 8' are subtracted from the radial forces determined from the second load cell 9'.

For all the embodiments, it is important that the bearing unit is stiff in both the radial and the axial directions. By mounting the bearings and the load cells, with or without the bearing supports, as described above, a bearing unit that is stiff in the radial direction is obtained. The stiffness in the axial direction is achieved in a known manner by using an axial support between the load cells and e.g. clamping nuts that hold the assembly together in the axial direction.

Figure 4:
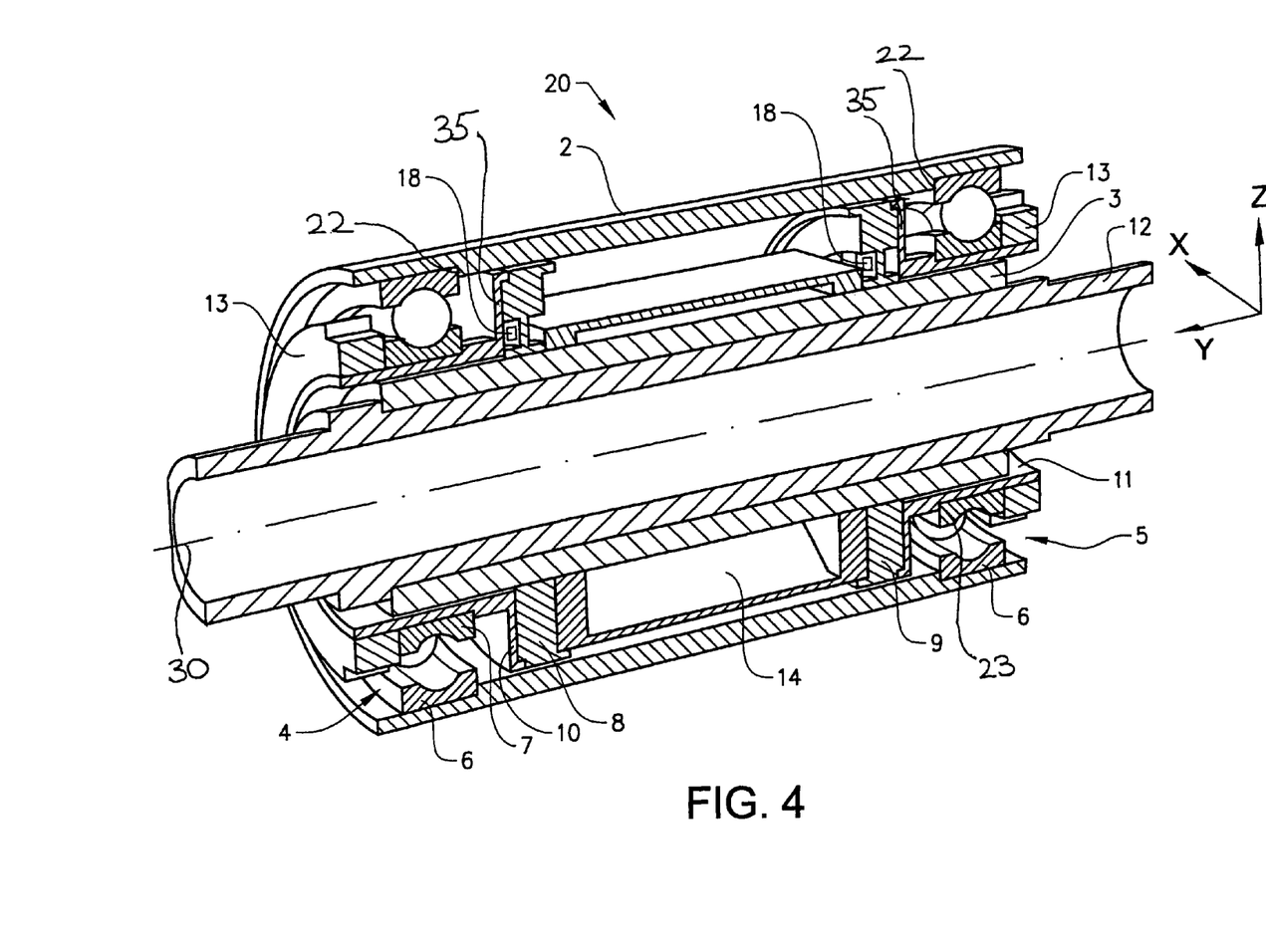
FIG. 4 shows a cut perspective view of another example of the first embodiment of a bearing unit according to the invention.

One example of an assembly incorporating a bearing unit of the kind depicted in FIG. 1 is shown in FIG. 4, where the bearing unit is used in a hub unit for e.g. a front wheel of a motor cycle. The hub unit 20 comprises an outer member 2 in the form of a hub that is mounted to a wheel and an inner member 3 in the form of a tubular element. The inner member 3 is mounted on a shaft 12 that will be mounted to a fork of the motor cycle. The hub unit comprises two, axially spaced apart rolling element bearing bearings 4, 5; in this example ball bearings. Each rolling element bearing comprises an outer ring 6 and an inner ring 7. In this example, the outer rings of the bearings are mounted to the hub in a rigid way by e.g. a press fit. Furthermore, the hub 2 comprises back stops 22 which located the bearing outer rings 6 in an inboard axial direction. The bearing outer rings are thus fixedly attached and positioned within the hub.

First and second load cells 8, 9, axially spaced apart, are attached to the inner tubular element 3 such that there is no play in the radial direction. In order to locate the load cells in the axial direction, and to increase the stability of the hub unit further, a distance tube 14 is provided between the load cells. The distance tube will help to stabilize the load cells in the axial direction. The load cells are preferably fixed to the distance tube, e.g. by screws. Depending on the material of the distance tube, it is also possible to braze, solder or weld the load cells to the distance tube.

The bearing unit comprises first and second flanged bearing supports 10, 11, and the first and second load cells 8, 9 are also attached to the first and second bearing supports 10, 11 respectively, in a fixed way. Depending on the materials of the load cells and the bearing supports, the mounting may be done by soldering, brazing or welding. It is also possible to attach the load cells to the bearing supports by screws or bolts. In this way, it will be possible to disassemble the hub unit. The bearing supports 10, 11 are provided with a flange 35 having essentially the same diameter as the load cells, which flange is mounted to a radial side face of the load cells 8, 9. The inner ring 7 of each bearing 4, 5 is mounted on the corresponding bearing support 10, 11. The inner rings 7 are located in an inboard axial direction by a back stop 23 on the bearing supports, and are located in an outboard axial direction by a locknut 13.

In this example, the inside diameter of the bearing supports is only slightly larger than the outside diameter of the inner tubular element 3. This maximises the radial compactness of the bearing unit and can also act as an additional overload protection (additional with regard to the overload protection incorporated within the load cells, as described with regard to FIG. 3). If the hub unit 20 is exposed to an unexpectedly excessive load, the bearing supports 10, 11 will temporarily touch the inner tubular element 3, thereby enhancing the safety of the bearing unit as a whole.

The load cells 8, 9 are mounted such that they extend in the radial direction, in a plane perpendicular to the axis of rotation 30. Each load cell is provided with strain sensors 18 that measure in this plane, the sensors 18 being mounted on the spokes as previously described. As shown in FIG. 4, the two load cells may be mounted with the same angular orientation, i.e. with the spokes on one load cell directly opposite the spokes on the other load cell. A different relative angular orientation is also possible. Depending on the number of displacement sensors used, a corresponding number of signals is obtained. In the example described above, twelve strain sensors are mounted on the two load cells; six on each load cell with one sensor on each side of a spoke. This gives a total of twelve measured signals from a bearing unit, and allows the loads in five or even six degrees of freedom to be determined. Fewer strain sensors can be used, depending on the loads of interest. The measured signals are combined such that the desired loads are calculated.

In order to be able to calculate the forces imposed on the bearing unit, the sensors of the bearing unit must be calibrated. This is done by applying a known external load to the bearing unit. This known load will comprise forces in three directions, that is a force $F_x$ acting in the x direction, a force $F_y$ acting in the y direction and a force $F_z$ acting in the z direction. The known load will also comprise a torque $M_x$ acting around the x axis, a torque $M_y$ acting around the y axis and a torque $M_z$ acting around the z axis. The signals from the sensors are measured and are used to derive a calibration matrix. The calibration matrix is stored in a memory and is used to calculate the forces imposed on the bearing unit during use, e.g. in a vehicle or a machinery.

Depending on the use of the machine in which the bearing unit is mounted, the forces and the torques in one or more directions may not be of interest. These forces and torques may thus be left out of the calibration procedure and thus also from the calibration matrix. This will reduce the required memory and calculation capacity of the control system. The number of strain sensors may also be reduced when the forces and torques in all directions are not to be measured. If only the forces are of interest, it is sufficient to use one strain sensor on each spoke of the load cells.

The most interesting forces acting on the bearing unit when mounted on a vehicle are the forces in the X, Y and Z axis of the bearing unit, i.e. $F_x$, $F_y$, $F_z$. The most interesting torque value is the torque acting around the X axis, i.e. the torque $M_x$.

It is also possible to integrate a temperature compensation for the measurements. This can be done in different ways. One possibility is to apply a temperature sensor on each load cell or on each spoke in a load cell. The measured temperature value is used to compensate the measured signal from a strain sensor with a temperature compensation factor or a table. In most cases, it will suffice to measure the temperature of each load cell or even of only one load cell. In this case, there is no need to temperature compensate each strain sensor individually.

Another possibility, when the strain sensors used are resistive strain gauges, is to use the strain gauges as temperature sensors. Since the strain gauges are resistive, the resistance value will depend on the temperature. By measuring the resistance of a strain gauge, the actual temperature is obtainable through a compensation factor or a table. Depending on the resistance of the strain gauge, this possibility will give a sufficiently high resolution for the temperature compensation.

If only one temperature sensor is used to measure the temperature of the bearing unit, it is possible that the temperature of the two load cells will differ. This will in turn give rise to an internal axial force between the load cells. By measuring the axial force in all the spokes and then adding them together, the influence of the internal force can be eliminated.

The strain sensors are to be connected to an electronic control unit that will calculate the force values. When strain gauges are used, the signals are preferably first connected to a signal converter that will transform the low level signals to a signal less sensitive to disturbance from outer sources. The signal converter may comprise a bridge circuit for each strain gauge, but may also comprise other signal converter functions. At least the signal converter is preferably contained in or close to the bearing unit. It is also possible to integrate the complete control unit in or close to the bearing unit. The control unit will in this example calculate the forces imposed on the bearing unit and will transfer these values to a control unit comprised in e.g. the vehicle. The control unit of the vehicle can use this information to e.g. adapt the suspension of the vehicle or to adapt the brake force when the vehicle is braking.

The inventive bearing unit may e.g. be mounted on a two or three wheeled vehicle, such as a motor cycle. The design of the bearing unit is in one example, as shown in FIG. 4, primarily intended to be mounted to a fork having two prongs, but it is also possible to mount a bearing unit to a fork or a swing having one prong. Depending on the design of this kind of fork or swing, some modifications of the bearing unit may be required. A bearing unit according to the invention may also be used in vehicles with four or more wheels.

The invention is not to be regarded as being limited to the embodiments described above, a number of additional variants and modifications being possible within the scope of the subsequent patent claims.

REFERENCE NUMERALS 1, 1': Bearing unit
2: Outer member
3: Inner member
4, 4': First rolling element bearing
5, 5': Second rolling element bearing
6: Outer bearing ring
7: Inner bearing ring
8, 8': First load cell
9, 9': Second load cell
10: First bearing support
11: Second bearing support
12: Shaft
13: Locknut
14: Distance tube between first and second load cells
15: Deformable portion (spoke)
18: Strain sensor 20: Hub unit
22: Axial back stop on hub
23: Axial backstop on bearing support
30: Axis of rotation
35: Radially extending flange of bearing supports
300: Load cell
305: First section of load cell
307: Bore of load cell
310: Second section of load cell
312: Mounting hole
315: Spoke
318: Strain sensor
320: Lateral centreline through spoke
325: Longitudinal centreline through spoke
330: Slots (through-cuts between load cell sections)

The invention claimed is:

1. A bearing unit comprising an outer member concentrically arranged around an inner member, a first rolling element bearing and a first load measuring device with a bore, wherein:
the first load measuring device is mounted to one of the members and supports the first rolling element bearing relatively to this one of the members; wherein
the first rolling element bearing is mounted to the other of the members and supports this other of the members relatively to the first load measuring device, the first rolling element bearing comprising a first ring, a second ring, and rolling elements arranged between the first and second rings; wherein
the first load measuring device and the first rolling element bearing are arranged laterally to each other in a radial gap between the inner and outer members; wherein
the first load measuring device is not disposed radially between the first ring and the one of the members to which the first load measuring device is mounted; and wherein:
the first rolling element bearing comprises a flange coupled with the first ring, wherein the flange is mounted to a radial side face of the first load measuring device.

2. The bearing unit according to claim 1, wherein the first load measuring device comprises a rigid first section and a rigid second section joined by at least one deformable portion, and the at least one deformable portion is provided with at least one strain sensor that lies on a plane perpendicular to an axis of rotation of the bearing unit.

3. The bearing unit according to claim 1, wherein the bearing unit comprises a second rolling element bearing mounted within the radial gap between the inner and outer members and axially spaced apart in relation to the first bearing.

4. The bearing unit according to claim 3, wherein the unit further comprises a second load measuring device arranged laterally to the second rolling element bearing, wherein the device is mounted in the radial gap between the inner and outer members and wherein the device supports the second rolling element bearing.

5. The bearing unit according to claim 4, wherein the first and second load measuring devices are arranged between the first and second rolling element bearings.

6. The bearing unit according to claim 5, wherein the first and second load measuring devices are connected by a stiff tube.

7. The bearing unit according to claim 1, wherein the unit is adapted for rotation of the outer member and at least the first load measuring device is mounted in contact around the inner member.

8. The bearing unit according to claim 7, wherein the outer member is one of a hub of a vehicle wheel and a rotational machine component, and a tubular element that is mountable within the hub.

9. The bearing unit according to claim 1, wherein the unit is adapted for rotation of the inner member and at least the first load measuring device is mounted in contact within the outer member.

10. The bearing unit according to claim 1, wherein the first load measuring device is axially offset from and radially overlaps the first ring.

11. A machine comprising a bearing unit having an outer member concentrically arranged around an inner member, a first rolling element bearing and a first load measuring device with a bore, wherein:
the first load measuring device is mounted to one of the members and supports the first rolling element bearing relatively to this one of the members; wherein
the first rolling element bearing is mounted to the other of the members and supports this other of the members relatively to the first load measuring device, the first rolling element bearing comprising a first ring, a second ring, and rolling elements arranged between the first and second rings; wherein
the first load measuring device and the first rolling element bearing are arranged laterally to each other in a radial gap between the inner and outer members, wherein
the first load measuring device is not disposed radially between the first ring and the one of the members to which the first load measuring device is mounted; and wherein
the bearing unit further comprises a bearing support for the first rolling element bearing, the bearing support comprising a radially extending flange that is mounted to a side face of the first load measuring device.

12. A device for measuring forces exerted on a rolling element bearing that is coupled to a mounting structure, wherein the device
has an axial centerline which, in use, coincides with an axis of rotation of the bearing, and
comprises a rigid first section and a rigid second section, the second section predominantly lying at a greater radial distance from the axial centerline than the first section, wherein
the first section and the second section of the device are joined by deformable portions having a thickness measured in axial direction that is smaller than a corresponding thickness of the rigid first and second sections; wherein
one of the rigid first and second sections is connectable to the mounting structure and the other of the first and second sections is connectable to a part of the rolling element bearing, such that forces exerted on the bearing are transmitted to the mounting structure through the device, wherein
the deformable portions comprise three spokes, wherein a strain sensor is provided on at least one spoke, on a first surface of the spoke that lies in a plane perpendicular to the axial centerline, and wherein
a radial distance between an inside diameter of the first section and an outside diameter of the second section is less than a length of one of the three spokes.

13. The device according to claim 12, wherein the length of each of the three spokes is greater than a width thereof, and wherein the three spokes define intersecting longitudinal centerlines, such that an area enclosed by the longitudinal centerlines is triangular in shape.

14. The device according to claim 13, wherein the device comprises three slots with a uniform, predetermined width, wherein
each slots forms a gap between the first and second sections in a region between two consecutive spokes, and forms a gap between the first section and a radially inner longitudinal edge of one spoke and between the second section and a radially outer longitudinal edge of the following spoke.

15. The device according to claim 12, wherein the strain sensor is arranged with an offset relative to a lateral centerline of the spoke on which it is provided.

16. The device according to claim 12, wherein a strain sensor is provided on first and second surfaces of at least one spoke, the second surface lying in a plane parallel to the first surface.

17. The device according to claim 16, wherein each of the spokes is provided on its first and second surfaces with a strain sensor.

18. A machine comprising a device for measuring forces exerted on a rolling element bearing that is coupled to a mounting structure, wherein the device
has an axial centerline which, in use, coincides with an axis of rotation of the bearing, and
comprises a rigid first section and a rigid second section, the second section predominantly lying at a greater radial distance from the axial centerline than the first section, and wherein
the first section and the second section of the device are joined by deformable portions having a thickness measured in axial direction that is smaller than a corresponding thickness of the rigid first and second sections; and wherein
one of the rigid first and second sections is connectable to the mounting structure and the other of the first and second sections is connectable to a part of the rolling element bearing, such that forces exerted on the bearing are transmitted to the mounting structure through the device, wherein,
the deformable portions comprise three spokes, and a strain sensor is provided on at least one spoke, on a first surface of the spoke that lies in a plane perpendicular to the axial centerline, and wherein
a radial distance between an inside diameter of the first section and an outside diameter of the second section is less than a length of one of the three spokes.

* * * * *